(12) United States Patent
Beaufils et al.

(10) Patent No.: US 9,676,645 B2
(45) Date of Patent: Jun. 13, 2017

(54) DEVICE FOR FLOWING MOLTEN GLASS

(71) Applicant: SAINT-GOBAIN ISOVER, Courbevoie (FR)

(72) Inventors: Sebastien Beaufils, Cernoy (FR); Patrice Martins, Lamorlaye (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 22 days.

(21) Appl. No.: 14/402,427

(22) PCT Filed: May 24, 2013

(86) PCT No.: PCT/FR2013/051135
§ 371 (c)(1),
(2) Date: Nov. 20, 2014

(87) PCT Pub. No.: WO2013/175135
PCT Pub. Date: Nov. 28, 2013

(65) Prior Publication Data
US 2015/0152001 A1 Jun. 4, 2015

(30) Foreign Application Priority Data

May 25, 2012 (FR) .................................... 12 54809

(51) Int. Cl.
*C03B 5/26* (2006.01)
*C03B 7/00* (2006.01)
*C03B 7/10* (2006.01)

(52) U.S. Cl.
CPC ................ *C03B 5/26* (2013.01); *C03B 7/005* (2013.01)

(58) Field of Classification Search
CPC .. C03B 5/26; C03B 7/00; C03B 7/005; C03B 7/10
See application file for complete search history.

(56) References Cited

U.S. PATENT DOCUMENTS 1,572,580 A * 2/1926 Troutman ............... C03B 13/02
65/100
1,647,541 A * 11/1927 Rau ........................ C03B 7/00
65/332

(Continued)

FOREIGN PATENT DOCUMENTS

DE 10 2007 024 481 A1 4/2008
GB 1 473 091 5/1977

(Continued)

OTHER PUBLICATIONS

International Search Report issued Aug. 16, 2013, in PCT/FR13/051135 filed May 24, 2013.

*Primary Examiner* — Cynthia Szewczyk
(74) *Attorney, Agent, or Firm* — Oblon, McClelland, Maier & Neustadt, L.L.P.

(57) ABSTRACT

A device for flowing molten glass suitable for installation on a glass melting furnace, including: a flow channel including an outlet of given diameter; and a device for regulating flow of molten glass at an outlet of the flow channel, including: a removable plate including a through-orifice with an area smaller than an area of the outlet of the flow channel; and a movable shuttering mechanism configured to adjustably shutter the outlet of the flow channel or the through-orifice of the removable plate. The device allows a single furnace to be used for various types of glasses having very different viscosities.

14 Claims, 2 Drawing Sheets

(56) References Cited

U.S. PATENT DOCUMENTS

| | | | |
|---|---|---|---|
| 3,560,188 A | | 2/1971 | Winzer |
| 4,592,770 A | * | 6/1986 | Pearman ............... C03B 5/0275 65/128 |
| 4,681,613 A | | 7/1987 | Porter |
| 5,567,218 A | * | 10/1996 | Ladirat ................. B22D 41/24 222/592 |

FOREIGN PATENT DOCUMENTS

| | | |
|---|---|---|
| JP | 57-88037 | 6/1982 |
| JP | 8-26740 | 1/1996 |
| JP | 8-290922 | 11/1996 |

\* cited by examiner

DEVICE FOR FLOWING MOLTEN GLASS

BACKGROUND

The invention relates to a device for flowing molten glass, which device is intended to be used on a furnace for melting glass.

A furnace for melting glass may have an orifice in the tank bottom, which orifice is intended to allow molten glass to flow from the furnace toward an apparatus, for example a fiberization device suitable for manufacturing glass fibers by internal centrifugation.

The viscosity of the molten glass depends on its composition and its melting point. The lower the viscosity of a glass, the faster it flows. Thus, a problem arises when it is sought to use the same furnace to melt glasses of possibly different viscosities, i.e. glasses possibly having very different melting points and/or glasses possibly having very different compositions.

SUMMARY

There is therefore a need for a device for flowing molten glass that allows a single furnace to be used for various types of glasses having very different viscosities.

For this purpose, the invention provides a device for flowing molten glass suitable for installation on a glass melting furnace, comprising:
  a flow channel having an outlet of given diameter; and
  a device for regulating the flow of molten glass at the outlet of the flow channel,
the device for regulating the flow of molten glass comprising:
  a removable plate comprising a through-orifice the area of which is smaller than the area of the outlet of the flow channel; and
  a movable shuttering means suitable for adjustably shuttering the outlet of the flow channel or the through-orifice of the removable plate.

According to another particularity, the through-orifice of the removable plate is ellipse shaped.

According to another particularity, the through-orifice of the removable plate is circular.

According to another particularity, the through-orifice of the removable plate (4) is polygon shaped.

According to another particularity, the movable shuttering means is able to move in rotation or in translation.

According to another particularity, the device for flowing molten glass furthermore comprises a stop for the movable shuttering means, the stop defining a maximum closed position of the outlet of the flow channel or of the through-orifice of the removable plate by the movable shuttering means.

According to another particularity, the walls of the flow channel and the outlet of the flow channel are each covered with a jacket made of a noble metal.

The invention also relates to a furnace for melting glass equipped with a device for flowing molten glass such as described above.

According to another particularity, the furnace is an electric furnace comprising a tank made of refractory blocks and at least one electrode immersed in the molten glass.

According to another particularity, the removable plate is used when the viscosity of the molten glass is less than or equal to at least 20% of the viscosity of the most viscous glass with which the device for flowing molten glass can be used without the removable plate.

The invention also relates to a process for manufacturing articles made of a mineral material, comprising melting a mineral material composition in the furnace described above, then converting the molten mineral material into articles made of mineral material, such as mineral fibers or mineral wool, via a conversion member, such as a fiberization member.

BRIEF DESCRIPTION OF THE DRAWINGS

Other features and advantages of the invention will now be described with regard to the drawings in which.

DETAILED DESCRIPTION

Reference numbers that are identical in the various figures represent similar or identical elements.

Throughout this Application, the term "glass" will be understood to mean a siliceous mineral material having an essentially or even totally amorphous structure.

The invention relates to a device for flowing molten glass from a furnace for melting glass. The device comprises a flow channel having an outlet of given diameter and a device for regulating the flow of glass at the outlet of the flow channel.

The device for regulating the flow of glass comprises a removable plate comprising a through-orifice the area of which is smaller than the area of the outlet of the flow channel, and a movable shuttering means suitable for adjustably shuttering the outlet of the flow channel or the through-orifice of the removable plate.

The removable plate and the shuttering means both allow the flow diameter of the molten glass to be reduced. The movable shuttering means in addition allows the flow of the molten glass to be regulated. The movable plate is particularly useful with glasses of very low viscosities. Since the flow diameter of the molten glass is reduced by the removable plate, the regulation by the movable shuttering means is then much more precise because it is carried out using a smaller hole. If the removable plate were absent, for a glass with a very low viscosity, it would be necessary to massively reduce the flow diameter of the molten glass with the movable shuttering means, making regulation much more difficult. In addition, with glasses of very low viscosity, there is a risk of the glass crystallizing if only the movable shuttering means is used to reduce the flow diameter of the molten glass because some of the molten glass, far from the flow orifice, may remain almost immobile on the shuttering means. Likewise, in the case where the movable shuttering means is cooled, there is a risk of the glass crystallizing if only the movable shuttering means is used with glasses of very low viscosity, because the molten glass, then makes contact with a large cooled area.

Combining the removable plate and the shuttering means thus allows the furnace for melting glass to be adapted to large viscosity differences.

Figure 1:
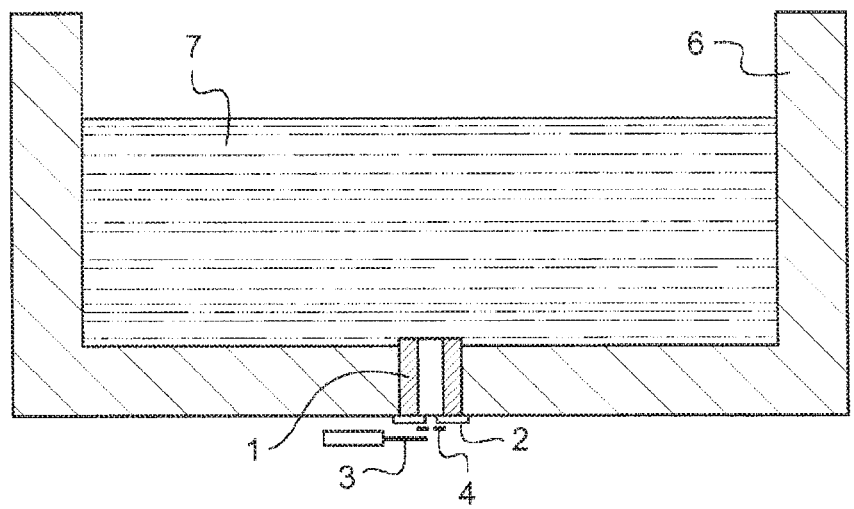
FIG. 1 shows a cross-sectional view of a furnace equipped with a device for flowing molten glass according to the invention.

FIG. 1 shows a cross-sectional view of a furnace equipped with a device for flowing molten glass according to the invention.

The device for flowing molten glass is intended to be installed on a furnace 6 such as that in FIG. 1, for example in the tank bottom as shown in the figure.

The furnace 6 will be described in more detail further on in the description.

Figure 2:
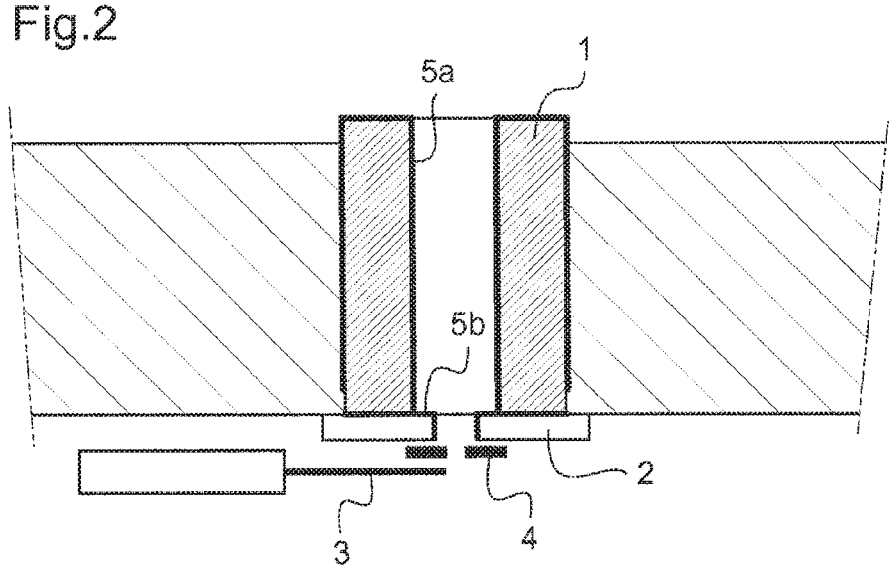
FIG. 2 is a cross-sectional view of a detail of FIG. 1, more precisely showing the device for flowing molten glass according to the invention.

FIG. 2 is a cross-sectional view of a detail of FIG. 1, more precisely showing the device for flowing molten glass according to the invention.

The device for flowing molten glass comprises a flow channel 1 suitable for installation on an orifice for feeding molten glass from a furnace, as shown in FIGS. 1 and 2. Preferably, for a manufacturing facility, the flow channel 1 has a tubular shape with two open ends. The flow channel 1 is for example made of molybdenum or of refractory steel. When the flow channel 1 is installed on a furnace tank bottom, the molten glass penetrates into the flow channel 1 via its upper end and exits via its lower end. At that end of the flow channel 1 via which the molten glass is intended to exit, the flow channel comprises an outlet that may have a diameter smaller than the inside diameter of the flow channel 1. The outlet 2 is for example also made of molybdenum or refractory steel. The diameter of the flow channel 1 at the outlet 2 is for example between 20 and 35 mm.

Figure 4A:
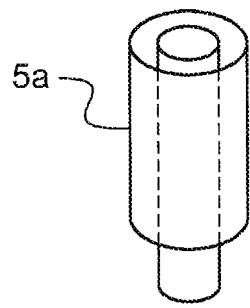
FIGS. 4a and 4b show perspective views of jackets 5a and 5b for the flow channel and the outlet of the flow channel of the device for flowing molten glass according to the invention.
Figure 4B:
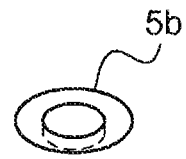

The flow channel 1 and the outlet 2 are preferably each covered, on their walls intended to make contact with the molten glass, with a jacket 5a, 5b made of a noble metal, such as platinum or iridium, in order to protect the flow channel 1 from possible corrosion and premature erosion. The jackets 5a, 5b, shown in more detail in FIGS. 4a and 4b, are made from a metal film made of a noble metal and are at least 0.2 mm in thickness and preferably about 0.5 mm in thickness.

The device for flowing molten glass also comprises a device for regulating the flow of molten glass at the outlet of the flow channel.

Figure 3:
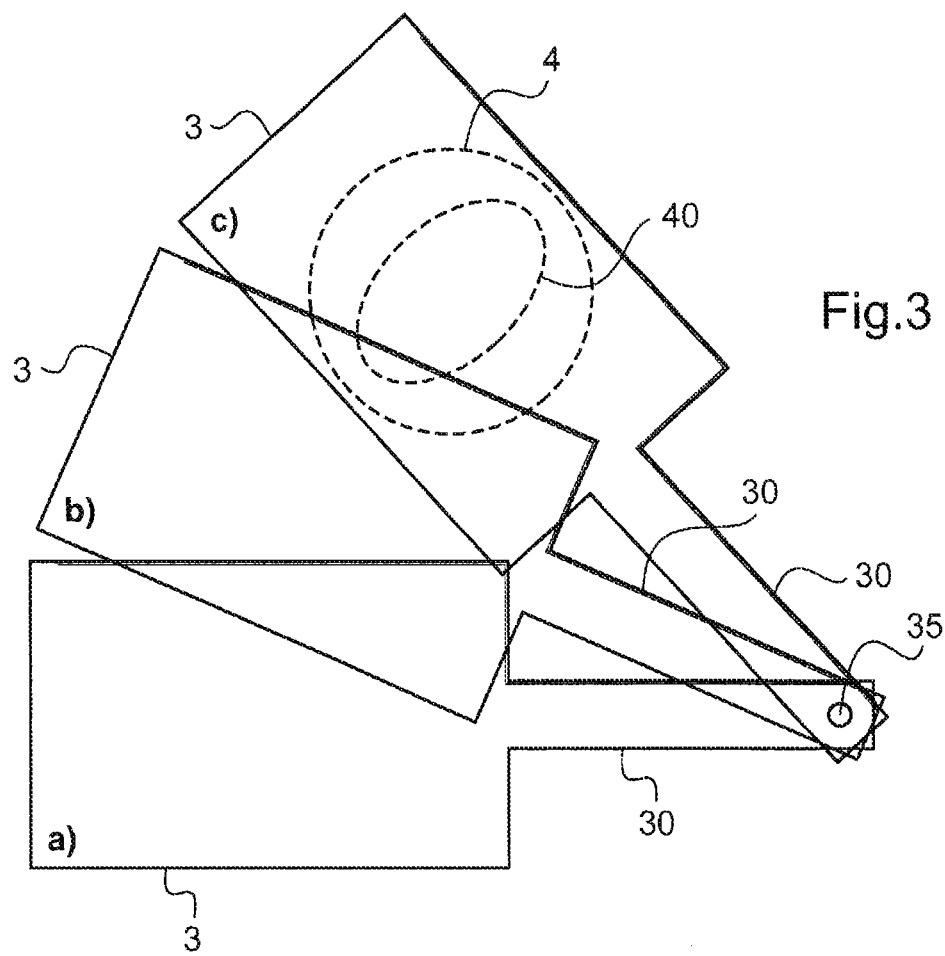
FIG. 3 shows a bottom view of an example device for regulating the flow of molten glass of a device for flowing molten glass according to the invention.

FIG. 3 shows a bottom view of an example device for regulating the flow of molten glass.

The device for regulating the flow of molten glass comprises a movable shuttering means 3. This movable shuttering means 3 is able to block, to a greater or lesser extent, the outlet 2 of the flow channel 1 in order to regulate the flow of molten glass flowing from the outlet 2 of the flow channel 1. The movable shuttering means 3 is able to move between a completely open position (position (a) in FIG. 3) and a completely closed position (position (c) in FIG. 3). The movable shuttering means 3 may occupy any position (b) between the extreme positions i.e. the "completely open" position (a) and the "completely closed" position (c). The device for regulating the flow of molten glass may comprise a stop defining the "completely closed" position (c) of the movable shuttering means.

The movable shuttering means 3 may for example be an unapertured plate able to move in rotation about an axis of rotation 35, for example via a rod 30, as shown in FIG. 3.

As a variant, the movable shuttering means 3 may consist of an unapertured plate able to move in translation.

As a variant, the movable shuttering means 3 may consist of two elements able to move in translation, arranged to move in two opposite directions (one toward the other or one away from the other).

The device for regulating the flow of molten glass also comprises a removable plate 4 comprising a through-orifice 40 the area of which is smaller than the area of the outlet 2 of the flow channel 1. The dimensions of the through-hole 40 in the removable plate allow the flow orifice of the molten glass to be made at least 30%, preferably at least 40% and even at least 50% smaller, relative to the outlet 2 of the flow channel 1.

Preferably, the through-orifice 40 is ellipse shaped. As a variant, it may be circular or any other suitable shape, such as, for example, square or rectangular or any other polygonal shape. An ellipse shape in particular makes it possible to make the obstructed area obtained more regular relative to a circular shape, during the angular movement of the shuttering means 3 about the axis of rotation 35.

The removable plate 4 may easily be fixed under the furnace, under the outlet 2 of the flow channel 1, for example using screws, and easily removed. During this operation, the outlet of the furnace is closed and the movable shuttering means 3 detached. The removable plate 4 may thus be installed or removed in a few minutes.

The removable plate 4 is preferably made of a noble metal, for example of platinum, in order to withstand corrosion by the glass at high temperature.

When the removable plate is installed, the movable shuttering means 3 is able to adjustably shutter the through-orifice 40 in the removable plate 4.

The removable plate 4 is, for example, used when the viscosity of the molten glass is lower than or equal to at least 20% of the viscosity of the most viscous glass with which the device for flowing molten glass can be used without the removable plate.

Preferably, the movable shuttering means 3 is cooled by a cooling system located in the thickness of the unapertured plate. Cooling the movable shuttering means 3 increases its longevity.

The invention also relates to a furnace 6 for melting glass, equipped with a device for flowing molten glass such as described above.

The furnace 6 is, for example, an electric furnace comprising a tank made of refractory blocks and at least one electrode immersed in the molten glass 7.

The furnace is suitable for use for manufacturing articles made of mineral material, for example glass fibers or glass wool.

Thus, the invention also relates to a process for manufacturing articles made of a mineral material (glass), comprising melting a mineral material composition (glass) in the furnace according to the invention, then converting the molten mineral material (molten glass) into articles made of mineral material, such as mineral fibers or mineral wool, via a conversion member, such as a fiberization member.

The invention claimed is:

1. A device for flowing molten glass suitable for installation on a glass melting furnace, comprising:
    a flow channel including an outlet of given diameter; and
    a device for regulating a flow of molten glass at the outlet of the flow channel,
    the device for regulating the flow of molten glass comprising:
        a removable plate comprising a through-orifice with an area smaller than an area of the outlet of the flow channel; and
        a movable shuttering means configured to adjustably shutter the outlet of the flow channel or the through-orifice of the removable plate, wherein the removable plate is located below the outlet of the flow channel, and wherein the movable shuttering means is located below the removable plate.

2. The device as claimed in claim 1, wherein the through-orifice of the removable plate is ellipse shaped.

3. The device as claimed in claim 1, wherein the through-orifice of the removable plate is circular.

4. The device as claimed in claim 1, wherein the through-orifice of the removable plate is polygon shaped.

5. The device as claimed in claim 1, wherein the movable shuttering means is configured to move in rotation.

6. The device as claimed in claim 1, further comprising a stop for the movable shuttering means, the stop defining a maximum closing position of the outlet of the flow channel or of the through-orifice of the removable plate by the movable shuttering means.

7. The device as claimed in claim 1, wherein walls of the flow channel and the outlet of the flow channel are each covered with a jacket made of a noble metal.

8. A furnace for melting glass comprising a device according to claim 1.

9. The furnace as claimed in claim 8, the furnace being an electric furnace comprising a tank made of refractory blocks and at least one electrode immersed in the molten glass.

10. A process for manufacturing articles made of a mineral material, comprising:

melting a mineral material composition in the furnace as claimed in claim 8;

then converting the molten mineral material into articles made of mineral material, or mineral fibers or mineral wool, via a conversion member, or a fiberization member.

11. The process as claimed in claim 10, further comprising attaching the removable plate to the furnace when viscosity of the molten glass is less than or equal to 20% of viscosity of a most viscous glass with which the device for flowing molten glass can be used without the removable plate.

12. The device as claimed in claim 1, wherein the movable shuttering means is configured to move in translation.

13. The device as claimed in claim 1, wherein the removable plate and the movable shuttering means are separate components.

14. The device as claimed in claim 1, further comprising a fiberization member.

* * * * *